United States Patent [19]

Ikeda et al.

[11] Patent Number: 5,178,766

[45] Date of Patent: Jan. 12, 1993

[54] COMPOSITE SEMIPERMEABLE MEMBRANE, PROCESS OF PRODUCING THE SAME AND METHOD OF PRODUCING HIGHLY PURE WATER USING THE SAME

[75] Inventors: Toshihiro Ikeda, Otsu; Yukio Nakagawa; Tadahiro Uemura, both of Kyoto; Masaru Kurihara, Otsu, all of Japan

[73] Assignee: Toray Industries, Inc., Japan

[21] Appl. No.: 742,408

[22] Filed: Aug. 8, 1991

[30] Foreign Application Priority Data

Aug. 9, 1990 [JP] Japan .................. 2-212493

[51] Int. Cl.$^5$ .................. B01D 61/00; B01D 39/00
[52] U.S. Cl. .................. 210/652; 210/653; 210/654; 210/490; 210/500.27; 210/500.38; 210/506; 210/900
[58] Field of Search .......... 210/652, 653, 654, 500.21, 210/500.27, 500.38, 506, 900, 651, 490, 638, 500.42

[56] References Cited

U.S. PATENT DOCUMENTS

| | | | |
|---|---|---|---|
| 4,277,344 | 7/1981 | Cadotte | 210/490 |
| 4,673,504 | 6/1987 | Ostreicher et al. | 210/500.38 |
| 4,743,418 | 5/1988 | Barnes, Jr. et al. | 210/490 |
| 4,927,540 | 5/1990 | Wessling et al. | 210/638 |
| 4,960,518 | 10/1990 | Cadotte et al. | 210/652 |
| 5,024,765 | 6/1991 | Linder et al. | 210/654 |

FOREIGN PATENT DOCUMENTS

| | | |
|---|---|---|
| 0056175 | 1/1981 | European Pat. Off. |
| 0211633 | 1/1986 | European Pat. Off. |
| 0242761 | 4/1987 | European Pat. Off. |

OTHER PUBLICATIONS

Derwent Abstracts C90–021269.
C89–138863.
C88–096371.
C88 033413.
C87–075449.
C87–013526.
C90–021268.
JPRO Abstracts 90.03.09 Sect. C, Section No. 699; vol. 14, No. 12, 6 p. 120.
89.12.13 Sect. C, Section No. 665; vol 13, No. 562, p. 36.
88.11.08 Sect. C, Section No. 541; vol. 12, No. 421, p. 10.
87.10.23 Sect. C, Section No. 454, vol. 11, No. 326 p. 18.
87.05.22 Sect. C, Section No. 423, vol. 11, No. 159, p. 30.
90.03.09 Sect. C, Section No. 699; vol. 14, No. 126, p. 120.

Primary Examiner—Robert A. Dawson
Assistant Examiner—Ana M. Fortuna
Attorney, Agent, or Firm—Austin R. Miller

[57] ABSTRACT

A composite semipermeable membrane which has a high electrolytes rejection even when the concentration of the electrolytes in feed water is very low and even if the pH of feed water is not less than 8 is disclosed. The composite semipermeable membrane of the present invention comprises a microporous substrate and a cross-linked polyamide-based ultra-thin membrane laminated on the microporous substrate, the ultra-thin membrane having a covalently bonded quaternary nitrogen atom.

10 Claims, No Drawings

COMPOSITE SEMIPERMEABLE MEMBRANE, PROCESS OF PRODUCING THE SAME AND METHOD OF PRODUCING HIGHLY PURE WATER USING THE SAME

BACKGROUND OF THE INVENTION

I. Field of the Invention

The present invention relates to a composite semipermeable membrane useful for selective separation of liquid mixture, especially for rejecting electrolytes in aqueous solutions with low salt concentration.

II. Description of the Related Art

Composite semipermeable membranes prepared by covering a microporous substrate with a ultra-thin membrane of a cross-linked polyamide obtained by interfacial polycondensation reaction between a polyfunctional amine and a polyfunctional acid halide are now drawing attention as reverse osmosis membranes with high permeability and high separation selectivity. Preparation of the composite membrane by the interfacial polycondensation reaction between the polyfunctional aromatic amine and the polyfunctional acid halide is disclosed in, for example, U.S. Pat. Nos. 4,277,344, 4,520,044, 4,529,646, 4,626,468, 4,643,829, 4,661,254, 4,749,488 and 4,761,234. These composite semipermeable membranes have almost satisfactory high permeability, high selective separation ability and durability even though they are not sufficient from a practical view point. Particularly, their electrolyte rejections from aqueous solutions containing not less than several hundred ppm of electrolytes are extremely high.

However, a problem is brought about when these composite semipermeable membranes are used as a secondary reverse osmosis membrane of two stage reverse osmosis system for producing ultrapure water which is used as washing water of semiconductor devices or the like. One of the purposes of the two stage reverse osmosis system including serially connected two reverse osmosis membrane elements is reducing the load on the ion-exchange process connected after the reverse osmosis system. Since the heaviest load on the ion-exchange tower is carbonic acid, removal of carbonic acid from the raw water is an important purpose of the treatment by the two stage reverse osmosis system. In water, carbonic acid shows equilibrium among carbonate ion, bicarbonate ion and dissolved carbon dioxide gas. According to the equilibrium, under pH of not higher than 6, carbonic acid is mainly in the form of dissolved carbon dioxide gas, under pH of 7-10, carbonic acid is mainly in the form of bicarbonate ion and under pH of not lower than 11, carbonic acid is mainly in the form of carbonate ion. Since carbon dioxide gas dissolved in water cannot be effectively removed by reverse osmosis membrane, it is necessary to make the raw water alkaline so as to convert the carbon dioxide gas to bicarbonate ion or carbonate ion to be effectively rejected by reverse osmosis membrane. Although it is preferred that alkali be added before the first reverse osmosis membrane to most effectively reject carbonic acid, if the raw water contains calcium ion and bicarbonate ion or carbonate ion, since these ions are concentrated by reverse osmosis treatment, insoluble calcium carbonate is formed and deposited on the composite semipermeable membrane, which causes fouling of the membrane surface.

To overcome this problem, it has been proposed to remove a part of the carbon dioxide gas prior to the first stage of the two stage reverse osmosis system (Japanese Laid-Open Patent Application (Kokai) No. 1-231988), or to operate the first stage at a low pH in which calcium carbonate is not precipitated and to operate the second stage at a pH of not lower than 8 by adding an alkali (U.S. Pat. No. 4,574,049, Japanese Laid-Open Patent Application (Kokai) Nos. 62-42787, 62-110795 and 63-28486). A method in which separation membranes with different membrane potentials has also been proposed (Japanese Laid-Open Patent Application (Kokai) No. 61-287492).

However, another problem is brought about if the conventional cross-linked polyamide-based semipermeable membrane is used in such a manner. That is, if the electrolyte concentration is lowered to as low as several ppm, the electrolyte rejection by the composite semipermeable membrane is drastically reduced, especially if the operation of the reverse osmosis is carried out at an alkaline pH.

A high electrolyte rejection is required even for the second stage reverse osmosis treatment wherein the electrolyte concentration is as low as several ppm in order to reduce the load on the ion exchanger connected after the two stage reverse osmosis system. A regenerative ion exchanger tower is usually connected after the reverse osmosis system. Recently, total organic carbon discharged from the regenerative ion exchanger is now drawing attention as a new problem. Thus, it is desired to prepare highly pure water by the two stage reverse osmosis system, which does not require the regenerative ion exchanger. However, for the present, the quality of the water prepared by the two stage reverse osmosis system is not so high such that the regenerative ion exchanger can be omitted. Thus, in order to reduce the number of times of regeneration of the ion exchanger as much as possible, it is necessary to reject the electrolytes of extremely low concentration as low as several ppm, which may be supplied to the second stage of the reverse osmosis system, at a high pH for eliminating dissolved carbon dioxide gas.

To promote the electrolyte rejection by the cross-linked polyamide membrane at a high pH, it has been proposed to coat the membrane with a quaternary ammonium salt (Japanese Laid-Open Patent Application (Kokai) No. 2-2827). However, with this membrane, since the quaternary ammonium salt is only attached to the cross-linked polyamide membrane by electrostatic force, the quaternary ammonium salt is gradually removed from the membrane if the reverse osmosis operation is continued for a long time. Further, the water flux of the membrane is reduced by the quaternary ammonium salt coated on the membrane.

Semipermeable membranes comprising a polymer having quaternary nitrogen atoms are known, which are used mainly as an ion-exchange membrane or ultrafiltration membrane. A reverse osmosis membrane made of a semipermeable membrane of this type is disclosed in Japanese Laid-Open Patent Application (Kokai) No. 63-151303. This reverse osmosis membrane is for treating the waste water from electrodeposition process. Although this reverse osmosis membrane has a relatively good selective rejection performance of cations, the rejection performance of anions and low molecular substances is poor, so that this reverse osmosis membrane does not satisfy the high permeability, high selective separation ability and high durability, which are required for practical reverse osmosis membranes.

On the other hand, the higher the water flux is, the lower the operation pressure can be. Thus, from the economical view point, the reverse osmosis membrane is desired to give a high water flux.

SUMMARY OF THE INVENTION

Accordingly, an object of the present invention is to provide a composite semipermeable membrane which exhibits high electrolyte rejection when used as a reverse osmosis membrane irrespective of the pH of the feed water even if the electrolyte concentration in the feed water is very low, which membrane also gives a large water flux.

The present inventors studied the cause of the sharp reduction of the electrolyte rejection when the feed electrolyte concentration is very low, especially at an alkaline pH. As a result, the present inventors discovered that when the electrolyte concentration is very low, especially at an alkaline pH, although the rejection of anions is not substantially reduced, the rejection of cations is sharply reduced, and higher the pH, the larger this reduction in the cation rejection. To overcome this problem of the reduction of the cation rejection, the present inventors intensively studied to find that if the cross-linked polyamide-based ultra-thin membrane has covalently bonded quaternary nitrogen atoms, the electrolyte rejection is satisfactorily high irrespective of the electrolyte concentration and of the pH of the feed water to be treated, and the water flux of the semipermeable membrane is also high. The present inventors also developed a process of producing such cross-linked polyamide-based ultra-thin membrane, thereby completing the present invention.

That is, the present invention provides a composite semipermeable membrane comprising a microporous substrate; and a cross-linked polyamide-based ultra-thin membrane superposed on the microporous substrate, the ultra-thin membrane having covalently bonded quaternary nitrogen atoms.

The present invention also provides a process of producing the composite semipermeable membrane of the present invention, comprising reacting a composite semipermeable membrane including a cross-linked polyamide-based ultra-thin membrane superposed on the microporous substrate with a compound which has a quaternary nitrogen atom and has a functional group with a reactivity with said cross-linked polyamide.

The present invention still further provides a method of producing highly pure water, comprising treating raw water by a two stage reverse osmosis system including serially connected two reverse osmosis membrane elements, at least one of said reverse osmosis membrane elements including the composite semipermeable membrane of the present invention.

If the composite semipermeable membrane of the present invention is used as a reverse osmosis membrane, the electrolyte rejection is high irrespective of the electrolyte concentration and of the pH of the feed water. Thus, even in cases where the electrolyte concentration is very low and the operation is carried out in alkaline pH as in the second stage in the two stage reverse osmosis system, the electrolyte rejection is high. Therefore, by employing the composite semipermeable membrane according to the present invention in the reverse osmosis system, the number of regeneration times of the regenerative ion exchanger connected after the two stage reverse osmosis system may be largely reduced or even the regenerative ion-exchanger may be eliminated. Further, the water flux of the cross-linked polyamide-based composite semipermeable membrane was drastically increased by the composite semipermeable membrane of the present invention. In the production of ultrapure water, a regenerative ion-exchanger tower is usually connected after the reverse osmosis system as mentioned above. If a highly pure water with a resistivity of not less than 5 M$\Omega$·cm is stably obtained, the regenerative ion-exchanger tower can be omitted, so that the problems caused by the regeneration of the ion-exchanger, such as fluctuation of the water quality and disposition of waste water, can be eliminated. By the method of producing highly pure water according to the present invention, highly pure water with a resistivity of not less than 5 M$\Omega$·cm can be stably obtained, so that the regenerative ion-exchanger tower can be omitted. Even when the regenerative ion-exchanger tower is used, the frequency of the regeneration of the ion-exchanger can be reduced. This brings about not only economical benefit but also the stabilization of water quality. Thus, the present invention will make a great contribute to the field of production of ultrapure water.

DETAILED DESCRIPTION OF THE PREFERRED EMBODIMENTS

The composite semipermeable membrane of the present invention has an ultra-thin membrane having separation efficiency laminated on a microporous substrate which substantially does not have separation capability. The ultra-thin membrane comprises a cross-linked polyamide as a major component. The ultra-thin membrane preferably consists essentially of a cross-linked polyamide.

The skeleton of the cross-linked polyamide is formed by an interfacial polycondensation reaction between a polyfunctional amine and a polyfunctional acid halide, and the cross-linked polyamide has quaternary nitrogen atoms in its side chains.

The polyfunctional amine is an amine having not less than two amino groups in one molecule and is a material for forming, together with the polyfunctional acid halide hereinbelow described, the skeleton of the cross-linked polyamide constituting the ultra-thin membrane of the composite semipermeable membrane of the present invention. As the polyfunctional amine, for example, m-phenylenediamine, p-phenylenediamine, 1,3,5-triaminobenzene, piperazine, 1,3-bispiperidylpropane, ethylene diamine and the like may be employed. In view of the separation selectivity of the membrane and the heat resistance, polyfunctional aromatic amines are preferred and examples of the preferred polyfunctional aromatic amines include m-phenylenediamine, p-phenylenediamine and 1,3,5-triaminobenzene. These amines may be employed individually or in combination. In particular, by employing a mixture of 1,3,5-triaminobenzene and m-phenylenediamine, a membrane with excellent permeability and separation selectivity may be obtained.

The polyfunctional acid halide is an acid halide having two or more halogenated carbonyl groups in one molecule and is a material for forming the cross-linked polyamide by the interfacial polycondensation reaction with the above-mentioned polyfunctional amine. Preferred examples of the polyfunctional acid halide include halides of alicyclic and aromatic acid such as 1,3,5-cyclohexanetricarboxylic acid, 1,3-cyclohexanedicarboxylic acid, 1,4-cyclohexanedicarboxylic acid, 1,3,5-benzenetricarboxylic acid, 1,3-benzenedicarboxylic acid, 1,4-benzenedicarboxylic acid and the like. The polyfunctional acid halide may be used individually or in combination.

In view of the reactivity with the polyfunctional amine, the polyfunctional acid halide may preferably be a polyfunctional acid chloride, and in view of the selective separation ability and heat resistance of the membrane, polyfunctional aromatic acid chlorides are preferred. Thus, the polyfunctional acid halide may most preferably be 1,3,5-benzenetricarboxylic acid chloride, 1,3-benzenedicarboxylic acid chloride, 1,4-benzenedicarboxylic acid or mixtures thereof.

The cross-linked polyamide having quaternary nitrogen atoms may be prepared by a method in which a polyfunctional amine having one or more quaternary nitrogen atoms and a polyfunctional acid halide are reacted so as to form the cross-linked polyamide; by a method in which the remaining amino groups in the cross-linked polyamide formed by the reaction between the polyfunctional amine and the polyfunctional acid halide is converted to quaternary alkyl ammonium by treating the cross-linked polyamide with an alkyl halide; or by a method in which a compound having one or more quaternary nitrogen atom and has a functional group which is reactive with the cross-linked polyamide is reacted with the cross-linked polyamide. Among these methods, the last-mentioned method is preferred because the quaternary nitrogen atoms can be introduced by a simple operation without substantially degrading the performance of the membrane. Examples of the functional group which is reactive with the cross-linked polyamide include epoxy group, aziridine group, episulfide group, halogenated alkyl group, amino group, carboxylic group, halogenated carbonyl group, hydroxy group and the like.

The quaternary nitrogen atom herein means the nitrogen atom contained in the group

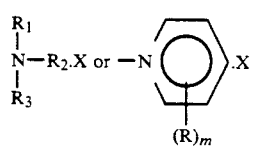

(wherein $R_1$, $R_2$, $R_3$ and R independently represent a substituted or non-substituted aliphatic group or substituted or non-substituted aromatic group, X represents an anion such as halogen ion, hydroxy ion, sulfate ion, nitrate ion, phosphate ion or the like). The group containing the quaternary nitrogen atom is hereinbelow indicated by the symbol

Preferred examples of the compound having one or more quaternary nitrogen atoms and epoxy group may be represented by the formula [I]:

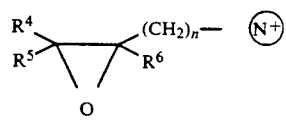

(wherein $R^4$, $R^5$ and $R^6$ independently represent hydrogen, substituted or non-substituted aliphatic group (preferably containing 1 to 3 carbon atoms) or substituted or non-substituted aromatic group, and n represents an integer of not less than 0). In view of the reactivity with the cross-linked polyamide, the performance of the obtained membrane and availability, glycidyltrimethylammonium chloride is preferred.

Preferred examples of the compound having one or more quaternary nitrogen atoms and aziridine group may be represented by the following formula [II]:

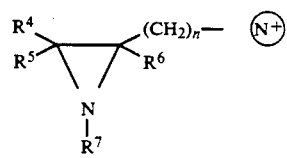

(wherein $R^4$, $R^5$, $R^6$ and $R^7$ independently represent hydrogen, substituted or non-substituted aliphatic group (preferably containing 1 to 3 carbon atoms) or substituted or non-substituted aromatic group, and n represents an integer of not less than 0).

Preferred examples of the compound having one or more quaternary nitrogen atoms and episulfide group may be represented by the formula [III]:

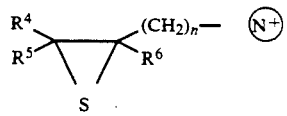

(wherein $R^4$, $R^5$ and $R^6$ represent the same meaning as in formula [I])

Since the skeleton of the cross-linked polyamide which is the major component of the ultra-thin membrane is formed by the interfacial polycondensation between the polyfunctional amine and the polyfunctional acid chloride, the cross-linked polyamide inevitably contains non-reacted amine residue and non-reacted acid residue. The above-described epoxy group, aziridine group and episulfide group are opened by the nucleophilic attack by the non-reacted amino group or the like in the cross-linked polyamide and binds to the cross-linked polyamide. Halogenated alkyl group reacts with primary amino group in the cross-linked polyamide to form secondary amino group, carboxylic group is condensed with amino residue in the cross-linked polyamide so as to form amide bond, halogenated carbonyl group acylates the amino residue in cross-linked polyamide, and amino group or hydroxy group are condensed with the carboxylic group in the cross-linked polyamide so as to form amide bonds or ester bonds, respectively. Thus, by reacting a compound having one or more of these groups and one or more quaternary nitrogen atoms with the cross-linked polyamide, the quaternary nitrogen atoms may be covalently introduced in the composite semipermeable membrane.

The cross-linked polyamide membrane has amino groups and carboxylic groups. Under low pH, the amino groups ionically dissociate so as to give positive charge to the membrane. On the other hand, the carboxylic groups ionically dissociate under high pH and give negative charge to the membrane. Thus, the electric charge in the membrane is changed by the pH. It is assumed that the negative charge is relatively high under high pH, so that the rejection of cations having opposite polarity is reduced. However, in the ultra-thin membrane employed in the present invention, since the quaternary nitrogen atom-containing group is a highly basic group and so it is ionically dissociated under any pH, so that it gives positive charge to the relatively negative membrane under high pH so as to neutralize the negative charge given by the carboxylic ion. It is assumed that by this neutralization effect, the rejection of cations under high pH is promoted.

It is also an important feature that the quaternary nitrogen atoms are introduced in the cross-linked polyamide by covalent bond. By virtue of the covalent bond, the quaternary nitrogen atoms are not removed from the membrane even if the reverse osmosis operation is continued for a long time. Further, it was found that the covalently introduced quaternary nitrogen atoms increase the water flux of the membrane.

The microporous substrate substantially does not have separation capability and is employed for reinforcing the ultra-thin membrane substantially having separation capability. The microporous substrate has micro pores of a uniform size or has micro pores of which pore size is gradually enlarged from a surface to another surface, and the pore size at the surface may preferably be not larger than 100 nm. Such a microporous substrate may be selected from commercially available materials such as "Millipore Filter VSWP" (trade name) commercially available from Millipore Co., Ltd. and "Ultrafilter UK10" (trade name) commercially available from Toyo Roshi Co., Ltd. Alternatively, the microporous substrate may preferably be, for example, a polysulfone microporous substrate reinforced with a cloth containing as a major component at least one of polyesters and aromatic polyamides. Such a substrate may be prepared in accordance with "Office of Saline Water Research and Development Progress Report" No. 359 (1968). As the material for forming the substrate, homopolymer or the blended polymers of, such as, polysulfone, cellulose acetate, cellulose nitrate and polyvinyl chloride may be employed. Among these, polysulfone is most preferred since it has chemical, mechanical and thermal stability. In particular, a polysulfone having a repeating unit [A]represented by the following formula, by which pore size is easily controlled and which has a high dimensional stability is preferred.

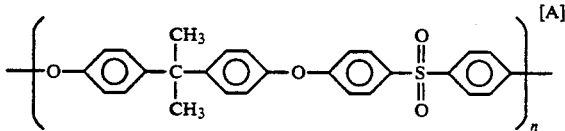

By casting a solution of this polysulfone in dimethylformamide (DMF) on a densely woven polyester cloth or a non-woven fabric to a prescribed thickness, and wet-coagulating the cast solution in an aqueous solution containing 0.5% by weight of sodium dodecyl sulfate and 2% by weight of DMF, a microporous substrate which has micro pores with diameters of not larger than 10 nm at most area of the surface may be obtained.

The process of producing the composite semipermeable membrane of the present invention will now be described.

The skeleton of the ultra-thin membrane with substantial separation capability in the composite semipermeable membrane may be formed by the interfacial polycondensation reaction using an aqueous solution containing the above-described polyfunctional amine and an organic solution containing the above-described polyfunctional acid halide in an organic solvent which is immiscible with water.

The concentration of the polyfunctional amine in the aqueous amine solution may preferably be 0.1–10% by weight, more preferably 0.5–5.0% by weight. The aqueous solution may contain a surfactant, organic solvent, alkaline compound, anti-oxidant and the like as long as it does not adversely affect the reaction between the polyfunctional amine and the polyfunctional acid halide. Further, the aqueous solution may contain a water-soluble macromolecular compound such as water-soluble polyvinyl alcohol in the amount not adversely affecting the performance of the membrane.

The application of the aqueous amine solution on the surface of the microporous substrate may be conducted by any appropriate method as long as the surface of the microporous substrate is covered with the aqueous amine solution uniformly and continuously. For example, the aqueous solution may be coated on the surface of the microporous substrate or the microporous substrate may be immersed in the aqueous solution.

The aqueous amine solution applied in excess is removed in a liquid-removing step. The excess solution may be removed by, for example, vertically holding the membrane so that the excess solution naturally drops from the membrane. It is preferred not to leave a drop on the membrane. Although the membrane may be dried after the excess solution is removed, this does not always bring about preferred results.

Then the organic solution of the above-described polyfunctional acid halide in the organic solvent is applied to the membrane to form the ultra-thin membrane containing cross-linked polyamide as the major component by the interfacial polycondensation.

The concentration of the polyfunctional acid halide in the organic solution may preferably be 0.01–10% by weight, more preferably 0.02–2% by weight. In some cases, it is preferred that the organic solution contain an acylation catalyst such as N,N-dimethylformamide since the interfacial polycondensation is enhanced.

The organic solvent is required to be immiscible with water, to dissolve the acid halide and not to destroy the microporous substrate. Any organic solvent satisfying these requirements, which is inert to the amino compound and to the acid halide may be employed. Preferred examples of the organic solvent include hydrocarbons, trichlorotrifluoroethane and the like. In view of the reaction rate and the volatility of the solvent, n-hexane and trichlorotrifluoroethane are preferred, and in view of the inflammability of the solvent, trichlorotrifluoroethane is most preferred.

The polyfunctional acid halide may be contacted with the aqueous phase of the polyfunctional amine in the same manner as the application of the aqueous amine solution on the microporous substrate. After application of the polyfunctional amine solution, the membrane may preferably be washed with an aqueous alkaline solution such as aqueous sodium carbonate solution.

The thus prepared composite semipermeable membrane is then contacted with the above-described compound having one or more quaternary nitrogen atoms and a functional group which is reactive with the composite semipermeable membrane (hereinafter referred to as "quaternary reactive compound" for short). As the quaternary reactive compound, the above-described compounds containing at least one of epoxy group, aziridine group, episulfide group, halogenated alkyl group, amino group, carboxylic group, halogenated carbonyl group and hydroxy group, as well as the quaternary nitrogen atom(s). These compounds may be employed individually or in combination. In view of the reactivity with the composite semipermeable membrane, performance of the prepared membrane and availability, glycidyltrimethylammonium chloride is preferred. The quaternary reactive compound may be contacted with the cross-linked polyamide by dissolving the quaternary reactive compound in a solvent which does not damage the composite semipermeable membrane, and coating this solution on the cross-linked polyamide or immersing the composite semipermeable membrane in this solution. The solvent which does not damage the composite semipermeable membrane is a solvent which does not dissolve or swell the ultra-thin membrane or the microporous substrate, and which does not substantially adversely affect the performance of the membrane. Preferred examples of the solvent include water, alcohol, hydrocarbons, trichlorotrifluoroethane and the like. In view of the solubility of the quaternary reactive compound, ease of handling and economy, water is most preferred. If the concentration of the quaternary reactive compound is low, the amount of the quaternary nitrogen atoms introduced in the cross-linked polyamide is small accordingly, and if the concentration of the quaternary reactive compound is high, the amount of the quaternary nitrogen atoms introduced in the cross-linked polyamide is large accordingly. Thus, by controlling the concentration of the quaternary reactive compound, the optimum electric charge may easily be selected. Taking the desired electric charge characteristics of the composite semipermeable membrane into consideration, the concentration of the quaternary ammonium compound may preferably be 0.1–20% by weight usually.

The composite semipermeable membrane contacted with the quaternary reactive compound is then left to stand for an appropriate period of time so as to allow the reaction between the cross-linked polyamide and the quaternary reactive compound. It is preferred to carry out the reaction at 50°–150° C. because the reaction time required for preparing the product may be shortened to 1–30 minutes. In some cases, a liquid-removing step for removing the excess quaternary reactive compound by, for example, vertically holding the membrane or a preliminary drying step are preferred to be carried out before heating the reactants to 50°–150° C. Alternatively, by heating the solution containing the quaternary reactive compound to 50°–100° C. and immersing the composite semipermeable membrane in this solution, the reaction time may also be shortened to 1–30 minutes.

By the above-described process, the composite semipermeable membrane of the present invention may be obtained. In a preferred mode of the present invention, the composite semipermeable membrane exhibits both a sodium ion rejection and chloride ion rejection of not less than 95% in evaluation of reverse osmosis membrane using 1 ppm aqueous sodium chloride solution as feed water having a temperature of 25° C. and a pH of 8–10 adjusted by sodium hydroxide under a pressure at which a water flux of 1 $m^3/m^2$·day is attained. The composite semipermeable membrane which exhibits this performance is hereinafter referred to as "high performance composite semipermeable membrane" for short. Such a high performance composite semipermeable membrane according to the present invention may be suitably applied for desalination of low concentration salt solutions, such as the water to be supplied to the second stage reverse osmosis membrane element in the two stage reverse osmosis system, which contains sodium ion of 1 ppm or less. Taking the economy of using the reverse osmosis membrane into consideration, the pressure required for attaining a water flux of 1 $m^3/m^2$·day is preferred to be 30 $kg/cm^2$ or less. On the other hand, in treating the raw water containing carbonic acid by the two stage reverse osmosis system, in order to effectively remove carbonic acid, the pH of the water supplied to the second stage reverse osmosis membrane should be 8–10, preferably 8.5–9.5. If such water is treated with the conventional composite semipermeable membrane which does not have the "high performance" defined above, although carbonic acid may be effectively removed, the cation concentration in the permeate is high so that the total electrolyte concentration in the permeate is high. Thus, to use the conventional composite semipermeable membrane which does not have the high performance, the operation should be carried out at a pH of not higher than 8. However, under this pH range, carbonic acid cannot be effectively removed. In contrast, by employing the high performance composite semipermeable membrane according to the present invention as the second stage reverse osmosis membrane, cations at low concentration can be effectively removed in the pH range of 8–10, so that not only carbonic acid is effectively removed, but also the total electrolyte concentration in the permeated water can be reduced.

As mentioned earlier, the present invention also provides a method of producing highly pure water. In this method, raw water is treated by a two stage reverse osmosis system having serially connected two reverse osmosis membrane elements, and the membrane of at least one reverse osmosis membrane elements is the composite semipermeable membrane according to the present invention, preferably with the high performance defined above. In one mode of the method of the present invention, an alkaline substance is added to the raw water before the first stage. In this case, the amount of the alkaline substance may preferably be adjusted so that the pH of the primary permeat from the first stage has a pH of 8–10, preferably 8.5–9.5. Although advantageous effect is obtained even if the composite semipermeable membrane of the present invention is employed as the first stage membrane, since the electrolytes with relatively high concentration can be largely removed even by the conventional composite semipermeable membrane, the advantageous effect unique to the present invention is obtained when the composite semipermeable membrane of the present invention is employed as the second stage membrane or both the second and first stage membranes. In another mode of the method of producing highly pure water according to the present invention, raw water is treated in the first stage and an alkaline substance is added to the primary permeate from the first stage and before the second stage. In this case, the amount of the alkaline substance may preferably be adjusted so that the pH of the water to be supplied to the second stage has a pH of 8-10, preferably 8.5-9.5. In this method, the composite semipermeable membrane of the present invention which preferably has the high performance is used as at least the second stage membrane. In cases where the raw water is relatively hard, carbonic acid-removing device may be provided before the two stage reverse osmosis system or an agent for preventing the formation of scale may be added to the raw water in order to prevent the formation of the scale on the reverse osmosis membrane. In the method according to the present invention, conventional steps employed together with the two stage reverse osmosis system, such as degassing step, antiseptics-adding step and antiseptics-removing step may be employed.

The invention will now be described in more detail by way of examples thereof. It should be noted that the examples are presented for illustration purposes only and should not be interpreted in any restrictive way.

In the examples, the solute rejection was calculated according to the following equation:

$$\text{Solute Rejection (\%)} = \left(1 - \frac{Y}{X}\right) \times 100$$

wherein X represents the concentration of solute in the supplied liquid and Y represents the concentration of the solute in the permeate.

The water flux indicates the amount of water (m$^3$) which passed through the membrane per 1 m$^2$ of the membrane per day.

In the examples, the river water was the water collected from Lake Biwa in Shiga, Japan.

REFERENCE EXAMPLE 1

On taffeta consisting of polyester fibers (both of the warp and weft are multifilament yarn of 150 denier, warp density: 90 warps/inch, weft density: 67 wefts/inch, 160 μm thickness), 15% by weight solution of polysulfone (Udel-P3500 commercially available from Union Carbide) in dimethylformamide (DMF) was cast at room temperature (20° C.) to a thickness of 200 μm. The resultant was immediately immersed in pure water and was left to stand for 5 minutes to prepare a fiber-reinforced polysulfone substrate (hereinafter referred to as "FR-PS substrate" for short). The thus obtained FR-PS substrate (210-215 μm) was immersed in an aqueous solution containing 1% by weight of 1,3,5-triaminobenzene and 1% by weight of m-phenylenediamine for one minute and was slowly drawn up in the vertical direction. After removing the excess aqueous solution from the surface of the substrate, a solution containing 0.05% by weight of 1,3,5-benzenetricarboxylic acid halide and 0.05% by weight of 1,4-benzenedicarboxylic acid chloride in trichlorotrifluoroethane was applied to the surface of the substrate such that the surface was completely wetted. After removing the excess solution by vertically holding the substrate, the substrate was washed with 1% by weight aqueous sodium carbonate solution.

EVALUATION METHOD 1

The standard performance of the composite semipermeable membrane was determined as follows:

The composite semipermeable membrane was subjected to a reverse osmosis test under a pressure of 15 kg/cm$^2$ at 25° C. using 1500 ppm of aqueous sodium chloride solution of which pH was adjusted to 6.5. From the measured amount of the permeate and the concentration of the sodium chloride contained in the permeate, water flux (m$^3$/m$^2$·day) and salt rejection (%) were determined.

EVALUATION METHOD 2

The membrane performance of the composite semipermeable membrane as the second stage reverse osmosis membrane was evaluated as follows:

Sodium hydroxide was added to the river water and the water was subjected to reverse osmosis treatment by a reverse osmosis element SU-710 commercially available from Toray Industries, Inc. The permeate was supplied to the second stage composite semipermeable membrane at a pressure of 15 kg/cm$^2$ at 25° C. The resistivity (MΩ·cm) and the ion concentration of the permeate from the second stage were measured and the ion rejection (%) was calculated.

EXAMPLE 1

The composite semipermeable membrane obtained in Reference Example 1 was immersed in 3% by weight aqueous glycidyltrimethylammonium chloride solution for 5 minutes and excess solution was removed by vertically holding the membrane. The resultant was then heated at 80° C. for 20 minutes in a drier and then washed with water.

The standard performance of the thus prepared composite semipermeable membrane was determined in accordance with the Evaluation Method 1. The water flux was 2.4 m$^3$/m$^2$·day and the sodium chloride rejection was 98.1%.

The membrane performance as the second stage membrane was evaluated according to the Evaluation Method 2. As a result, when the pH of the water supplied to the second stage was 9, the permeate from the second stage had a resistivity of 5.0 MΩ·cm and the membrane showed a sodium ion rejection of 95.2%. The sodium ion concentration in the water supplied to the second stage was 0.60 ppm.

EXAMPLE 2

On the composite semipermeable membrane prepared in Reference Example 1, 3% by weight aqueous glycidyltrimethylammonium chloride solution was applied and the resultant was left to stand for one minute. After removing water from the membrane by vertically holding the membrane, the membrane was heated at 110° C. for 2 minutes in a drier and then washed with water.

The standard performance of the thus prepared composite semipermeable membrane was determined in accordance with the Evaluation Method 1. The water flux was 1.5 m$^3$/m$^2$·day and the sodium chloride rejection was 96.5%.

The membrane performance as the second stage membrane was evaluated according to the Evaluation Method 2. As a result, when the pH of the water supplied to the second stage was 9, the permeate from the second stage had a resistivity of 2.2 MΩ·cm and the membrane showed a sodium ion rejection of 97.3%. The sodium ion concentration in the water supplied to the second stage was 0.60 ppm.

EXAMPLE 3

The composite semipermeable membrane prepared in Reference Example 1 was immersed in 10% by weight aqueous glycidyltrimethylammonium chloride solution heated at 80° C. for 10 minutes and then washed with water.

The membrane performance as the second stage membrane was evaluated according to the Evaluation Method 2. As a result, when the pH of the water supplied to the second stage was 9, the permeate from the second stage had a resistivity of 3.0 MΩ·cm and the membrane showed a sodium ion rejection of 94.0% and water flux of 0.65 m$^3$/m$^2$·day. The sodium ion concentration in the water supplied to the second stage was 0.60 ppm.

COMPARATIVE EXAMPLE 1

The standard performance of the composite semipermeable membrane prepared in Reference Example 1 was determined in accordance with the Evaluation Method 1. The water flux was 1.0 m$^3$/m$^2$·day and the sodium chloride rejection was 99.5%.

The membrane performance as the second stage membrane of the composite semipermeable membrane prepared in Reference Example 1 was evaluated according to the Evaluation Method 2. As a result, when the pH of the water supplied to the second stage was 9, the permeate from the second stage had a resistivity of 0.9 MΩ·cm and the membrane showed a sodium ion rejection of 81.8%. The sodium ion concentration in the water supplied to the second stage was 0.66 ppm.

EXAMPLE 4

The composite semipermeable membrane prepared in Example 2 was subjected to a reverse osmosis test using 1 ppm aqueous sodium chloride solution as the feed water at a pressure of 10 kg/cm$^2$, at 25° C. When the pH of the feed water was 8, 9 and 10, the sodium ion rejection was 97.9%, 98.5% and 99.3%, respectively and the chloride ion rejection was 95.7%, 98.8% and 99.1%, respectively. The water flux was 1.0 m$^3$/m$^2$·day.

COMPARATIVE EXAMPLE 2

The composite semipermeable membrane prepared in Reference Example 1 was subjected to a reverse osmosis test using 1 ppm aqueous sodium chloride solution as the feed water at a pressure of 15 kg/cm$^2$, at 25° C. When the pH of the feed water was 8, 9 and 10, the sodium ion rejection was 89.5%, 85.2% and 78.8%, respectively and the chloride ion rejection was 99.5%, 99.6% and 99.6%, respectively. The water flux was 1.0 m$^3$/m$^2$·day.

EXAMPLE 5

Employing the composite semipermeable membrane prepared in Example 2, a reverse osmosis membrane element was prepared in a conventional manner. Using the prepared reverse osmosis membrane element as the second stage membrane element, highly pure water was prepared from river water by the following method. Sodium hydroxide was added to the river water and this water was supplied to the first stage reverse osmosis element SU-710 commercially available from Toray Industries, Inc. at a pressure of 15 kg/cm$^2$, at 25° C. The permeate from the first stage was supplied to the second stage reverse osmosis membrane element at a pressure of 10 kg/cm$^2$, at 25° C. The quality of the produced highly pure water was promoted as the pH of the water supplied to the second stage was raised. When the pH of the water supplied to the second stage was 9, the concentration of the ions in the produced highly pure water, which give the load on the subsequent ion exchanger, was the minimum and the total ion concentration except for hydrogen ion and hydroxy ion was $1.6 \times 10^{-6}$ mol/l. The produced highly pure water had a resistivity of 7.5 MΩ·cm.

COMPARATIVE EXAMPLE 3

Highly pure water was produced in the same manner as in Example 5 except that the composite semipermeable membrane used in the second stage reverse osmosis membrane element was that prepared in Reference Example 1. When the pH of the water supplied to the second stage was 9, the total ion concentration except for hydrogen ion and hydroxy ion was $4.4 \times 10^{-6}$ mol/l. The produced highly pure water had a resistivity of 1.9 MΩ·cm.

EXAMPLE 6

Employing the composite semipermeable membrane prepared in Example 2, a reverse osmosis membrane element was prepared in a conventional manner. Using the prepared reverse osmosis membrane element as the second stage membrane element, highly pure water was prepared from river water by the following method. River water was supplied to the first stage reverse osmosis element SU-710 commercially available from Toray Industries, Inc. at a pressure of 15 kg/cm$^2$, at 25° C. Sodium hydroxide was added to the permeate from the first stage and the resulting water was supplied to the second stage reverse osmosis membrane element at a pressure of 10 kg/cm$^2$, at 25° C. The quality of the produced highly pure water was promoted as the pH of the water supplied to the second stage was raised. When the pH of the water supplied to the second stage was 9, the concentration of the ions in the produced highly pure water, which give the load on the subsequent ion exchanger, was minimum and the total ion concentration except for hydrogen ion and hydroxy ion was $4.6 \times 10^{-6}$ mol/l. The produced highly pure water had a resistivity of 3.7 MΩ·cm.

COMPARATIVE EXAMPLE 4

Highly pure water was produced in the same manner as in Example 6 except that the composite semipermeable membrane used in the second stage reverse osmosis membrane element was that prepared in Reference Example 1. When the pH of the water supplied to the second stage was 9, the total ion concentration except for hydrogen ion and hydroxy ion was $7.1 \times 10^{-6}$ mol/l. The produced highly pure water had a resistivity of 1.0 MΩ·cm.

Although the invention was described by way of preferred embodiments thereof, it is apparent for those skilled in the art that various modifications may be made without departing from the spirit and scope of the present invention.

We claim:

1. A composite semipermeable membrane comprising:

a microporous substrate; and a cross-linked polyamide ultra-thin membrane laminated on said microporous substrate, said ultra-thin membrane having covalently bonded quaternary nitrogen atoms.

2. The composite semipermeable membrane of claim 1, which exhibits sodium ion rejection and chloride ion rejection of not less than 95% in evaluation of reverse osmosis membrane using 1 ppm aqueous sodium chloride solution as feed water having a temperature of 25° C. and a pH of 8-10 adjusted by sodium hydroxide, under a pressure effective to produce a water flux of 1 $m^3/m^2 \cdot day$ is attained.

3. A process of producing the composite semipermeable membrane of claim 1, comprising reacting a composite semipermeable membrane including a cross-linked polyamide ultra-thin membrane laminated on the microporous substrate with a compound which has a quaternary nitrogen atom as functional group and said functional group with a reactivity with said cross-linked polyamide.

4. The process of claim 3, wherein said functional group is at least one selected from the group consisting of epoxy group, aziridine group, episulfide group, halogenated alkyl group, amino group, carboxylic group, halogenated carbonyl group and hydroxy group.

5. The process of claim 4, wherein said functional group is epoxy group.

6. A method of producing highly pure water, comprising treating raw water by a two stage reverse osmosis system including serially connected two reverse osmosis membrane elements, wherein at least one of said reverse osmosis membrane elements include a composite semipermeable membrane comprising a microporous substrate; and a cross-linked polyamide ultra-thin membrane having covalently bonded quaternary nitrogen atoms.

7. A composite semipermeable membrane comprising:

a microporous substrate; and a cross-linked polyamide ultra-thin membrane laminated on said microporous substrate, said ultra-thin membrane having covalently bonded quaternary nitrogen atoms contained in a group selected from

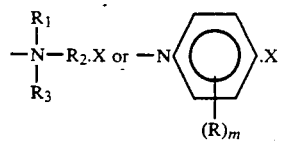

a functional group selected from the group consisting of epoxy group, aziridine group, episulfide group, halogenated alklyl group, amino group, carboxylic group, halogenated carbonyl group and hydroxy group.

8. The composite semipermeable membrane of claim 7 wherein said anion is selected from the group consisting of a halogen ion, a hydroxy ion, a sulfate ion, a nitrate ion and a phosphate ion.

9. The composite semipermeable membrane of claim 7 wherein said functional group is represented by the formula (II):

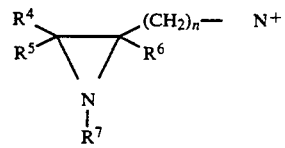

wherein $R^4$, $R^5$, $R^6$ and $R^7$ independently represent hydrogen, substituted or non-substituted aliphatic group or substituted or non-substituted aromatic group, and "n" represents an integer of not less than "0".

10. The composite semipermeable membrane of claim 7 wherein

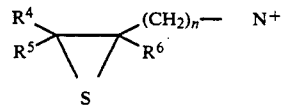

wherein $R^4$, $R^5$, and $R^6$ independently represent hydrogen, substituted or non-substituted aliphatic group or substituted or non-substituted aromatic group, and "n" represents an integer of not less than "0".

* * * * *

UNITED STATES PATENT AND TRADEMARK OFFICE
CERTIFICATE OF CORRECTION

PATENT NO. : 5,178,766
DATED : January 12, 1993
INVENTOR(S) : Toshihiro Ikeda et al It is certified that error appears in the above-identified patent and that said Letters Patent is hereby corrected as shown below:

Column 16, before line 9, insert --wherein $R_1$, $R_2$, $R_3$, and R independently represent a substitute or non-substituted aliphatic group, or a substituted or non-substituted aromatic group, and X represents anion; and wherein said quarternary nitrogen atoms have--.

Column 16, line 34, after "wherein" insert --said functional group is represented by the formula (III):--.

Signed and Sealed this

Twenty-sixth Day of October, 1993

BRUCE LEHMAN

*Attest:*

*Attesting Officer*

*Commissioner of Patents and Trademarks*